(12) United States Patent
Chen

(10) Patent No.: US 8,689,901 B2
(45) Date of Patent: Apr. 8, 2014

(54) ELECTRIC POWER TOOL

(75) Inventor: Bach Pangho Chen, Claremont, CA (US)

(73) Assignee: X'Pole Precision Tools Inc., Taoyuan County (TW)

( * ) Notice: Subject to any disclaimer, the term of this patent is extended or adjusted under 35 U.S.C. 154(b) by 503 days.

(21) Appl. No.: 12/778,600

(22) Filed: May 12, 2010

(65) Prior Publication Data
US 2011/0278035 A1  Nov. 17, 2011

(51) Int. Cl.
*E21B 3/00* (2006.01)
*E21B 17/22* (2006.01)
*E21B 19/16* (2006.01)
*E21B 19/18* (2006.01)
*B23B 45/00* (2006.01)

(52) U.S. Cl.
USPC ........................................... 173/217; 173/170

(58) Field of Classification Search
USPC .................. 173/1–21, 170, 141, 160–161
See application file for complete search history.

(56) References Cited

U.S. PATENT DOCUMENTS

| | | | |
|---|---|---|---|
| 4,667,119 A | 5/1987 | Holmes | |
| 5,443,196 A * | 8/1995 | Burlington | 227/131 |
| 5,553,675 A * | 9/1996 | Pitzen et al. | 173/217 |
| 6,460,629 B2 * | 10/2002 | Bookshar et al. | 173/176 |
| 6,523,442 B2 * | 2/2003 | Lehnert et al. | 81/467 |
| 6,749,028 B1 | 6/2004 | Chan et al. | |
| 6,923,268 B2 * | 8/2005 | Totsu | 173/2 |
| 7,044,234 B2 * | 5/2006 | Manschitz et al. | 173/48 |
| 7,076,830 B2 * | 7/2006 | Conner et al. | 15/339 |
| 7,090,030 B2 * | 8/2006 | Miller | 173/2 |
| 7,210,541 B2 * | 5/2007 | Miller | 173/2 |
| 7,638,725 B2 | 12/2009 | Aoki et al. | |
| 7,836,968 B2 * | 11/2010 | Steverding et al. | 173/1 |
| 2003/0196824 A1 * | 10/2003 | Gass et al. | 173/131 |
| 2004/0040727 A1 * | 3/2004 | Miller | 173/2 |
| 2004/0134019 A1 * | 7/2004 | Cipolla et al. | 15/340.2 |
| 2005/0071056 A1 * | 3/2005 | Tondra et al. | 701/23 |
| 2006/0096767 A1 * | 5/2006 | Miller | 173/2 |
| 2007/0034394 A1 * | 2/2007 | Gass et al. | 173/2 |
| 2007/0074883 A1 * | 4/2007 | Strasser et al. | 173/104 |
| 2007/0114049 A1 * | 5/2007 | Steverding et al. | 173/4 |
| 2007/0144753 A1 * | 6/2007 | Miller | 173/217 |
| 2007/0296286 A1 * | 12/2007 | Avenell | 310/50 |
| 2008/0196912 A1 * | 8/2008 | Gass et al. | 173/4 |
| 2009/0071671 A1 * | 3/2009 | Zhong et al. | 173/176 |
| 2009/0071673 A1 * | 3/2009 | Zhong et al. | 173/216 |
| 2009/0205848 A1 * | 8/2009 | Wilson et al. | 173/1 |
| 2010/0237124 A1 * | 9/2010 | Shima et al. | 227/8 |
| 2010/0307782 A1 * | 12/2010 | Iwata et al. | 173/1 |

(Continued)

*Primary Examiner* — Robert Long
(74) *Attorney, Agent, or Firm* — Muncy, Geissler, Olds & Lowe, P.C.

(57) ABSTRACT

An electric power tool receives an input power from an electric power source and converts the input power to a driving power to drive an electric motor. The electric power tool further includes a manual control mechanism, a magnetic control element and a power modulation circuit. The manual control mechanism includes a trigger portion movable by depressing of a user and a magnetic element movable with the trigger portion. The magnetic control element outputs an output control signal in proportion to alterations of a magnetic field caused by movements of the magnetic element. The power modulation circuit gets the input power and modulates to the driving power controlled by the output control signal to drive the electric motor. Thus by depressing the trigger portion, output power of the electric motor can be controlled to provide precise control of rotational speed and torque alterations.

7 Claims, 3 Drawing Sheets

(56) References Cited

U.S. PATENT DOCUMENTS

| | | |
|---|---|---|
| 2011/0042114 A1* | 2/2011 | Steverding et al. ............ 173/18 |
| 2011/0095066 A1* | 4/2011 | Feng et al. .................... 227/131 |
| 2011/0147026 A1* | 6/2011 | Pellenc ......................... 173/170 |
| 2011/0180286 A1* | 7/2011 | Oomori et al. ................. 173/20 |
| 2011/0250828 A1* | 10/2011 | Chen ............................. 451/456 |

* cited by examiner

ELECTRIC POWER TOOL

FIELD OF THE INVENTION

The present invention relates to an electric power tool and particularly to a structure to achieve detailed control of electric power tools through a magnetic element and a magnetic control element incorporating with a control circuit.

BACKGROUND OF THE INVENTION

Small electric power tools generally are made at a small size and a lower cost and can be coupled with different application tools to form various types, such as emery wheel machines, drilling machines, electric wrenches and the like that can assist workers to carry out some work processes quickly, thus are widely adopted. Electric power tools get driving power from electricity to drive motor which further drives application tools to rotate. U.S. Pat. No. 4,667,119 entitled "Trigger switch" discloses a trigger and switch for electric power tools. The trigger includes a sleeve and a pillar housed in the sleeve. The switch includes a set of switch contacts and another set of auxiliary contacts that are located sequentially on a movement path of the pillar. The trigger is depressible to move the sleeve and pillar to butt sequentially the switch contacts and auxiliary contacts (depending on the pressure) to provide different functions. In short, this prior art triggers a plurality of switches according to different depressing pressures to activate various functions.

Other references of trigger structures for electric power tools can be found in U.S. Pat. Nos. 6,749,028 and 7,638,725.

All the aforesaid trigger structures of the electric power tools have a trigger and a switch mechanism that respectively adopt a contact structure. While they are provided respectively with a staged control structure, the staged control structure of the switch mechanism is quite complicated. To achieve more precise multi-staged control effect, the switch structure becomes even more complex that results in a higher cost. Moreover, although the staged control can change output power or functions according to the depressing pressure, the wrench generally can provide merely two or three preset rotational speeds. The power or rotational speed are different among the stages and cannot be determined by users when in use, hence are not desirable for precise fabrication or handcrafted processes. For instance, on electric power tools for fabrication purpose, such as grinding machines, polishing machines, cutting machines and the like, usability and efficiency are affected by many factors, notably: 1. material hardness, density and heat resistance of the fabricated work pieces; 2. fine and coarse degree of fabrication interfaces and material characteristics; and 3. fabrication speed and quality requirements. Moreover, the speed and torque at the instant contact of tools and fabricated work pieces, during regular fabrication period, and separation thereof are different and also different while the tools are worked on a flat surface and non-flat surface. Hence to accomplish optimal fabrication effect output power of the electric power tools must be adjusted accordingly, such as the grinding machines, polishing machines, cutting machines and the like. All the aforesaid conventional techniques provide adjustment stages that are too few in number and too large in differences between them, thus are not desirable for precise and delicate fabrication processes.

SUMMARY OF THE INVENTION

The primary object of the present invention is to solve the problem of conventional electric power tools that have difficulty in providing precise control. The present invention provides an improved control structure for electric power tools by offering continuous and controllable output alterations.

The electric power tool according to the invention is adopted for use on an electric power tool which receives an input power from an electric power source and converts the input power to a driving power to drive an electric motor. The electric power tool includes a manual control mechanism, a magnetic control element and a power modulation circuit. The manual control mechanism includes a trigger portion movable by depressing of a user and a magnetic element movable with the trigger portion. The magnetic control element outputs an output control signal in proportion to alterations of a magnetic field caused by movements of the magnetic element. The power modulation circuit gets the input power and modulates the input power into the driving power to drive the electric motor. The driving power is controlled by the output control signal.

By means of the structure set forth above, the trigger portion is depressed by a user to move the magnetic element to cause the magnetic control element to generate the output control signal according to the alterations of the magnetic field, and the output control signal changes the driving power to adjust operation of the electric motor. Such a technique provides an advantage that alterations of the magnetic force and output control signal are continuous and controllable not merely ON/OFF or two stages or three stages. The user can control output forces of the electric motor to provide precise control of alterations of rotational speed and torque by changing a force applied on the trigger portion.

The foregoing, as well as additional objects, features and advantages of the invention will be more readily apparent from the following detailed description, which proceeds with reference to the accompanying drawings.

DETAILED DESCRIPTION OF THE PREFERRED EMBODIMENT

Figure 1:
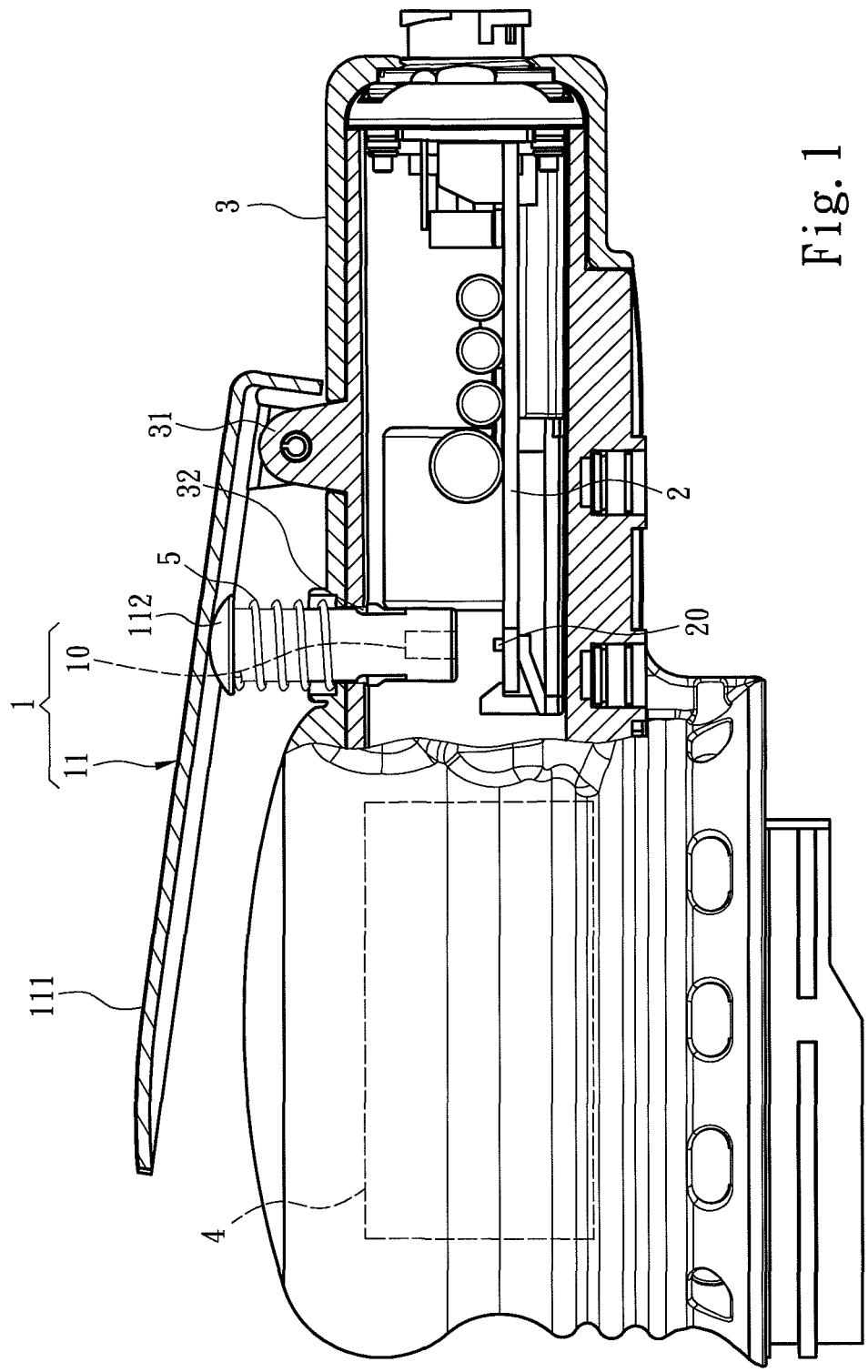
FIG. 1 is a schematic view of an electric power tool according to the invention.
Figure 2:
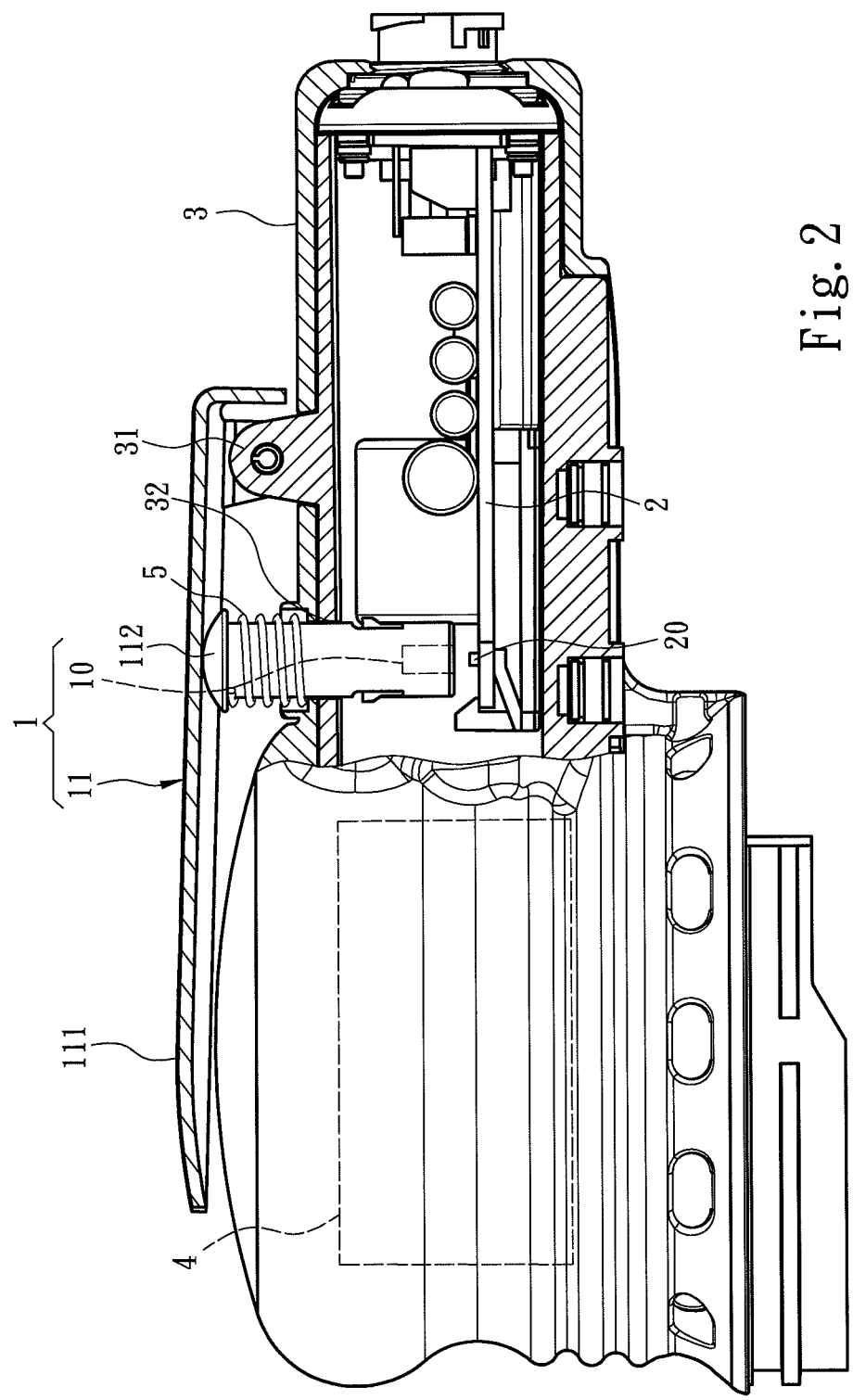
FIG. 2 is a schematic view of the electric power tool of the invention in an operating condition.
Figure 3:
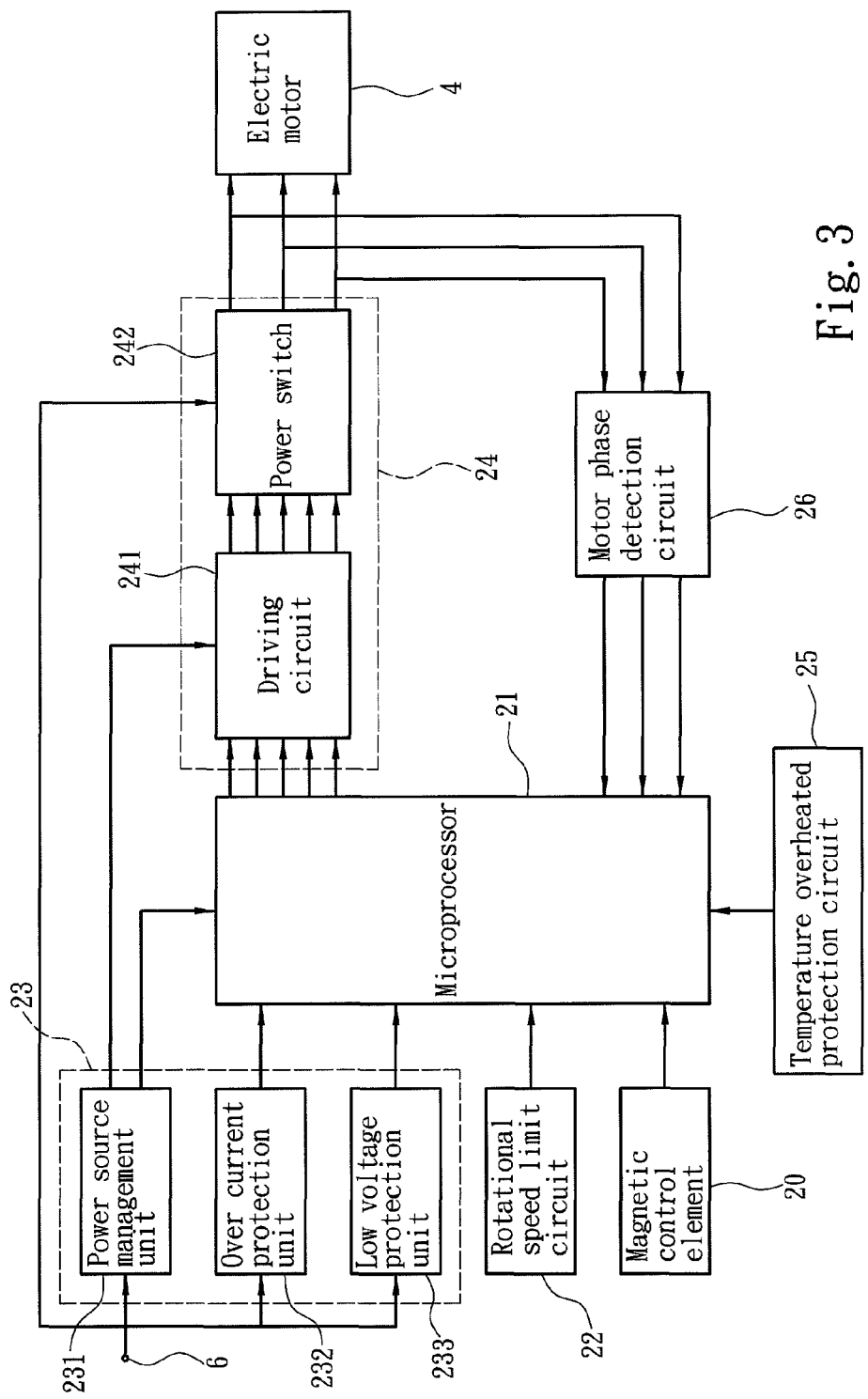
FIG. 3 is a circuit block diagram of the electric power tool of the invention.

Please refer to FIGS. 1 and 2 for an embodiment of the invention. The present invention aims to provide an electric power tool which includes an electric motor 4 capable of coupling with various application tools (such as grinding wheels), but the adopted application tools and electric motor 4 are not the limitation of the invention. The electric power tool includes a power modulation circuit 2 to receive an input power from an electric power source 6 (referring to FIG. 3) and modulate the input power into a driving power to drive the electric motor 4 at a selected rotational speed and torque. To control the amount of the driving power, the power modulation circuit 2 is electrically connected to a magnetic control element 20. The electric power tool further includes a manual control mechanism 1 which includes a trigger portion 11 movable by depressing of a user and a magnetic element 10 movable with the trigger portion 11. When the trigger portion 11 is depressed by the user, the magnetic element 10 is moved with the trigger portion 11 at the same time to generate alterations of a magnetic field. The magnetic control element 20 detects the alterations of the magnetic field and outputs an output control signal in proportion to the alterations of the magnetic field. The output control signal is sent to the power modulation circuit 2 to modulate the driving power. Therefore, the driving power is controlled by the output control signal. The magnetic element 10 may be a magnet. The magnetic control element is a Hall sensor. By means of the technique set forth above, the movements of the manual control mechanism 1 can adjust the driving power in a continuous and precise fashion rather than merely ON/OFF or two-stage rotational speeds in the conventional electric power tools. Thereby controllability of the electric power tool improves and the same electric power tool is applicable to different work purposes, such as more sophisticated mechanisms output smaller power by depressing the trigger portion 11 lightly. On the other hand, on mechanical structures which can withstand heavier load, a greater force can be exerted on the trigger portion 11 to increase the power.

The electric power tool shown in FIGS. 1 and 2 also includes a housing 3, and the trigger portion 11 includes a depressible element 111 and a movable element 112. The magnetic element 10 is coupled on the movable element 112. The depressible element 111 is movably coupled on the housing 3. The housing 3 has a bracing dock 31 hinged by the depressible element 111 as a fulcrum to provide a displacement thereof. The movable element 112 butts a lower side of the depressible element 111. The housing 3 further has a movement track 32 holding the movable element 112. When the depressible element 111 is moved, the movable element 112 is driven and moved along the movement track 32. Moreover, the movable element 112 and the movement track 32 are interposed by an elastic element 5 which has two ends butting respectively the housing 3 and movable element 112 to provide an elastic force to restore the movable element 112 to its original position after moved. The movement of the movable element 112 also moves the magnetic element 10 coupled thereof to generate alterations of the magnetic field that is detected by the magnetic control element 20. Also refer to FIG. 3 for the block diagram of an embodiment of the power modulation circuit 2. The trigger portion 11 is depressed to generate a signal through the magnetic element 10 and magnetic control element 20 to control operation of the power modulation circuit 2. The power modulation circuit 2 at least includes a microprocessor 21 and an electric power converter 24 to convert the input power to the driving power. When the magnetic control element 20 detects the alteration of the magnetic field, the magnetic control element 20 outputs an output control signal in proportion to the alteration of the magnetic field. The microprocessor 21 gets the output control signal and outputs a power modulation signal in proportion to the output control signal. The electric power converter 24 determines the power of the driving power to be output according to the power modulation signal. The electric power converter 24 may include a driving circuit 241 and a set of power switch 242. The driving circuit 241 outputs one or more pulses to control ON or OFF of the power switch 242 to convert the input power to the driving power. The driving power can be single or three phase depending on the structure of the electric motor 4. The types and operation principles of the driving circuit 241 and power switch 242 are known in the art and do not limit the scope of the invention. The magnetic control element 20 sends the output control signal to the microprocessor 21 which outputs a power modulation signal in proportion to the output control signal so that the electric power converter 24 determines the power of the driving power to be output. As a result, the alteration of the output control signal affects power alteration of the driving power. By means of the technique previously discussed, the physical movement of the magnetic element 10 is converted to output control signal of the magnetic control element 20 that further affects the power of the driving power output to the electric motor 4. The power modulation circuit 2 further has a rotational speed limit circuit 22 which outputs a rotational limit signal to the microprocessor 21 to limit the maximum range of the power modulation signal output by the microprocessor 21 and the maximum rotational speed of the electric motor 4, thereby a power margin of the driving power is provided to give an adjustment room between the rotational speed and torque of the electric motor 4. Thus when the electric motor 4 has reached the maximum rotational speed, by depressing the trigger portion 11 to generate alterations of the magnetic field, the microprocessor 21 can be facilitated to adjust the torque output by the electric motor 4 at the same rotational speed. The power modulation circuit 2 also includes a power detection circuit 23, a temperature overheated protection circuit 25 and a motor phase detection circuit 26. The power detection circuit 23 includes a power source management unit 231, an over current protection unit 232, and a low voltage protection unit 233. The power source management unit 231, over current protection unit 232 and low voltage protection unit 233 are connected to the electric power source 6 to detect the input power, and set respectively a maximum current value and a minimum voltage value through the over current protection unit 232 and low voltage protection unit 233. When the input power gets a current higher than the maximum current value or a voltage lower than the minimum voltage value, the over current protection unit 232 or low voltage protection unit 233 outputs a protection signal to trigger the microprocessor 21 to enter a protection mode. The power source management unit 231 captures a biased electric power during the electric power source 6 supplies regular input power to the microprocessor 21 and driving circuit 241. The temperature overheated protection circuit 25 detects the operation temperature of the electric power tool. When the operation temperature of the electric power tool is higher than a preset maximum temperature, the temperature overheated protection unit 25 outputs a temperature overheated protection signal to trigger the microprocessor 21 to enter the protection mode. The motor phase detection circuit 26 detects the phase of the electric motor 4 during operation for the microprocessor 21 as control reference.

As a conclusion, the invention provides technical features that allow users to depress the trigger portion 11 to move the magnetic element 10 to cause the magnetic control element 20 to generate an output control signal according to alterations of magnetic field. The output control signal changes the power of the driving power to adjust operation of the electric motor 4. The alterations of magnetic force and output control signal are continuous and controllable rather than merely ON/OFF or two stages or three stages. Thus by changing the force applied on the trigger portion 11, output power of the electric motor 4 also can be controlled to provide precise control of the rotational speed and torque and improve controllability of the electric power tool. Therefore, one electric power tool can be used on different types of works to meet various purposes.

While the invention has been described by means of a specific embodiment, numerous modifications and variations could be made thereto by those skilled in the art without departing from the scope and spirit of the invention set forth in the claims.

In summation of the above description, the present invention provides a significant improvement over the conventional techniques and complies with the patent application requirements, and is submitted or review and granting of the commensurate patent rights.

What is claimed is:

1. An electric power tool receiving an input power from an electric power source and converting the input power to a driving power to drive an electric motor, the electric power tool further comprising: a manual control mechanism which includes a trigger portion movable by depressing by a user and a magnetic element mechanically movable with the trigger portion, the trigger portion including a depressible element to receive an external depressing force and a movable element housing the magnetic element, the depressible element including a pressing surface corresponding to and in contact with the movable element;

a magnetic control element to output an output control signal in proportion to alterations of a magnetic field caused by movement of the magnetic element; and a power modulation circuit which obtains the input power and modulates the input power into the driving power to drive the electric motor; the modulated driving power being controlled by the output control signal;

wherein the electric power tool includes a housing which has a movement track to hold the movable element and to allow the movable element together with the housed magnetic element to move along the movement track when the movable element is pressed by the pressing surface of the depressible element, and wherein the depressible element is movably coupled on the housing.

2. The electric power tool of claim 1, wherein the movable element and the movement track are interposed by an elastic element which includes two ends butting respectively the housing and the movable element to provide an elastic force to restore the movable element to an original position after moved.

3. The electric power tool of claim 1, wherein the power modulation circuit includes a microprocessor to get the output control signal and an electric power converter to modulate and convert the input power to the driving power, the microprocessor outputting a power modulation signal in proportion to the output control signal, the electric power converter determining power of the driving power to be outputted according to the power modulation signal.

4. The electric power tool of claim 2, wherein the power modulation circuit includes a rotational speed limit circuit which outputs a rotational speed limit signal to the microprocessor to limit a maximum range of the power modulation signal output from the microprocessor.

5. The electric power tool of claim 2, wherein the power modulation circuit includes a power detection circuit which sets a minimum voltage value and a maximum current value and outputs a protection signal to trigger the microprocessor to enter a protection mode when the input power is lower than the minimum voltage value or greater than the maximum current value.

6. The electric power tool of claim 2, wherein the power modulation circuit includes a temperature overheated protection circuit to detect operation temperature of the electric power tool and output a temperature overheated protection signal when the operation temperature of the electric power tool is higher than a preset maximum temperature.

7. The electric power tool of claim 1, wherein the magnetic control element is a Hall sensor and the magnetic element is a magnet.

\* \* \* \* \*